(12) United States Patent
Rischen et al.

(10) Patent No.: US 11,117,247 B2
(45) Date of Patent: Sep. 14, 2021

(54) EXCHANGEABLE JAW FOR PRESSING TOOL

(71) Applicant: Viega Technology GmbH & Co. KG, Attendorn (DE)

(72) Inventors: Christian Rischen, Eslohe (DE); Markus Faulstich, Raunheim (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 196 days.

(21) Appl. No.: 16/197,702

(22) Filed: Nov. 21, 2018

(65) Prior Publication Data
US 2019/0152032 A1    May 23, 2019

(30) Foreign Application Priority Data
Nov. 23, 2017    (DE) .................... 10 2017 127 707.2

(51) Int. Cl.
| | | |
|---|---|---|
| *B25B 27/10* | (2006.01) | |
| *B21D 37/04* | (2006.01) | |
| *B21D 39/04* | (2006.01) | |
| *F16L 33/02* | (2006.01) | |

(52) U.S. Cl.
CPC .............. *B25B 27/10* (2013.01); *B21D 37/04* (2013.01); *B21D 39/046* (2013.01); *B21D 39/048* (2013.01); *F16L 33/02* (2013.01)

(58) Field of Classification Search
CPC ... B25B 27/10; B25B 7/00; B25B 5/00; B23P 11/00; B23P 11/05; B21D 37/04; B21D 39/046; B21D 39/048; F16L 33/02
USPC ......... 29/235, 237, 238, 239, 257, 268, 271, 29/278
See application file for complete search history.

(56) References Cited

U.S. PATENT DOCUMENTS

| | | | |
|---|---|---|---|
| 2,739,373 A * | 3/1956 | Kane, Jr. ................. | F16L 19/04 29/237 |
| 5,377,400 A | 1/1995 | Homm | |
| 7,188,508 B2 | 3/2007 | Bowles et al. | |
| 2002/0056308 A1 | 5/2002 | Frenken | |

(Continued)

FOREIGN PATENT DOCUMENTS

| | | |
|---|---|---|
| CN | 2056114 U | 4/1990 |
| CN | 2515842 Y | 10/2002 |

(Continued)

OTHER PUBLICATIONS

EP1231027 Machine Translation (Year: 2002).*

*Primary Examiner* — Lee D Wilson
*Assistant Examiner* — Alberto Saenz
(74) *Attorney, Agent, or Firm* — The Webb Law Firm (57) ABSTRACT

The disclosure relates to an attachment for a base jaw of a pressing tool for pressing fittings in order to produce pipe connections, comprising an attachment body, a pressing section, formed on the attachment body, to form half of a jaw opening, and comprising a connecting section, formed on the attachment body, for a connection to the base jaw. The technical problem of providing attachments for exchangeable jaws, base jaws and systems which allow an improved use for fittings of different nominal widths is solved in that the pressing section and the connecting section are arranged at a distance from one another. The invention also relates to a base jaw and to a system consisting of at least two pairs of attachments and one pair of base jaws.

15 Claims, 7 Drawing Sheets

(56) References Cited

U.S. PATENT DOCUMENTS

2009/0293577 A1* 12/2009 Hamm .................. B25B 7/04
                                                72/416
2011/0289998 A1   12/2011 Zhang
2012/0042710 A1    2/2012 Polofsky
2015/0321238 A1   11/2015 Hofmann

FOREIGN PATENT DOCUMENTS

| CN | 201702729 U | 1/2011 | |
|---|---|---|---|
| CN | 104470683 B | 3/2017 | |
| DE | 9307956 U1 | 7/1993 | |
| DE | 4419862 C1 | 11/1995 | |
| DE | 4446503 C1 | 5/1996 | |
| DE | 10106363 C1 | 6/2002 | |
| DE | 102004005558 A1 | 8/2005 | |
| DE | 102004045156 A1 | 3/2006 | |
| DE | 102009023020 A1 | 12/2009 | |
| EP | 0611613 A1 | 8/1994 | |
| EP | 0826441 B1 | 4/2001 | |
| EP | 1208949 A2 | 5/2002 | |
| EP | 1231027 A2 * | 8/2002 | ............. B25B 27/10 |
| FR | 2767736 A1 | 3/1999 | |

\* cited by examiner

EXCHANGEABLE JAW FOR PRESSING TOOL

CROSS-REFERENCE TO RELATED APPLICATION

This application claims priority to German Patent Application No. 10 2017 127 707.2 filed Nov. 23, 2017, the disclosure of which is hereby incorporated in its entirety by reference.

FIELD OF THE INVENTION

The invention relates to an attachment for a base jaw of a pressing tool for pressing fittings in order to produce pipe connections, where two base jaws and two attachments together form a pressing jaw of a pressing tool, comprising an attachment body, a pressing section, formed on the attachment body, to form half of a jaw opening which forms the receiving are for the fitting to be pressed, and comprising a connecting section, formed on the attachment body, to connect to the base jaw. The invention also relates to a base jaw of a pressing tool for pressing fittings in order to produce pipe connections, comprising a base jaw body, an articulated seat for a connection to a further base jaw and comprising an interaction section for interaction with a pressing tool. The invention also relates to a system for pressing fittings to produce pipe connections.

The technical field which is relevant to the present invention is the on-site installation of pipeline systems, whereby in general a pipeline system consisting of pipe sections and fittings is installed to conduct and guide a fluid. In principle, the term "fitting" is understood as meaning a connecting piece of a pipeline and is most frequently used to connect two or more pipe sections. Accordingly, the fitting has two or more pressing sections. The most common fittings are straight connections, changes in direction in the form of elbow pipes, reducers, branch pipes such as tee joints or intersections. However, a "fitting" is also understood as a pipe connection of a valve or of another component. For example, thermometers or manometers as valves have only one connection for a pipe section. Thus, this fitting then has only one pressing section to connect a pipe section to the valve.

BACKGROUND OF THE INVENTION

To connect the pipe sections to the fittings and to other components, press connections are used in which, following the insertion of the pipe section, a pressing section of a fitting is deformed radially inwards by a pressing tool so that a permanent and tight connection is produced which, if required, can even be inextricably. In this respect, the fittings can be provided with a sealing agent, for example with an O ring, which ensures the tightness of the connection, or they can also be configured to be metallically sealing, for example, through direct contact of the materials of the pipe section and of the fitting.

Pressing systems which have a purely radial action as the pressing method are possible for a radial deformation of the pressing section as well as pressing systems which use a radial-axial pressing action are possible as the pressing method, where a part of the fitting is moved axially during the pressing procedure to thereby produce a radial deformation.

The pipeline systems which have been previously described in a general fashion are used in particular for the transportation of drinking water or heating water, of gas for operating a heating system or for the transportation of industrial gases.

The attachments described above for a respective base jaw are also known as exchangeable jaws and are used on site to be able to press fittings of different nominal widths by means of the same pressing tool. For this purpose, exchangeable attachments which form jaw openings of different sizes for the required nominal widths are provided at the two base jaws which form one pressing jaw.

For this purpose, the attachments have a partly cylindrical or semi-cylindrical form which has a connecting section on the outside for a connection to a corresponding connecting section of the base jaw. The inner contour is then adapted to the nominal width to be achieved. This means that the attachments for different nominal widths vary their thickness in radial direction.

The base jaw itself also forms a partly cylindrical or semi-cylindrical connecting section which serves to receive the different attachments. The distal section of the base jaw is therefore formed by the base jaw body itself, and it is formed identically for all attachments of different nominal widths.

Since they differ in size, fittings of different nominal widths require pressing forces of different magnitudes. Therefore, the base jaws on which the attachments are fastened have to be configured for the maximum pressing force of the attachments to be used. This also applies in particular to the outer contour of the distal section of the base jaw body which surrounds the connecting section. Consequently, the overall size of the base jaw and thus also of the combination of base jaw and attachment is determined by the maximum pressing force to be achieved and is disproportionately large for the use in the case of small nominal widths. Therefore, when exchangeable jaws are used during the pressing of fittings which have small nominal widths, problems of space arise, so that there is a risk that it will not be possible to install and/or press fittings correctly.

Previously described attachments and base jaws are disclosed in EP 0 826 441 B1.

Therefore, the present invention is based on the technical problem of providing attachments for exchangeable jaws, base jaws and systems which allow an improved use of fittings which have different nominal widths.

SUMMARY OF THE INVENTION

The afore-mentioned technical problem is solved first of all according to the invention in the case of an attachment, mentioned at the outset, for a base jaw of a pressing tool for pressing fittings to produce pipe connections, in that the pressing section and the connecting section are arranged at a distance from one another.

According to the invention, it has been found that the attachment itself forms the entire distal section of the assembled pressing jaw consisting of base jaw and attachment, and that the connecting section of the attachment is disassociated from the cylindrical form of the jaw opening. The interface, formed by the connecting section, to the base jaw can consequently be arranged at a distance from the region of the pressing section, so that more options for the configuration of the attachments for different nominal widths are provided.

As a result of moving the connecting section away from the pressing section, it is possible to adapt the overall size of the interconnected base jaw and attachment, in particular the outer contour in the region of the distal end and of the connecting section, to the pressing force which is to be applied. As a result, the attachment can be configured to be smaller overall for small nominal widths, so that fittings of small nominal widths and of a relatively close arrangement can be suitably pressed in a reliable and simple manner when pipes and valves are installed.

The pressing section is preferably formed integrally, i.e. consisting of the same material, or in an integrated manner as a separate element with the attachment body. Thus, every attachment has a fixed pressing section and is used as a whole as an exchangeable jaw.

Furthermore, the pressing surface of the pressing section of each attachment, thus the actual pressing contour, corresponds in its dimensions to a nominal value of an external diameter of a fitting. Thus, a suitable attachment can be connected to the base jaw as an exchangeable jaw for any nominal width.

The connecting section preferably forms, at least in sections, a substantially planar interface to the base jaw. The formation of the interface in a substantially planar form is understood such that the interface does not have a partly cylindrical or semi-cylindrical form. Furthermore, "substantially planar" means that the interface does not have to have a smooth planar form, but it can be formed in a graduated manner and has connection means which are described in the following. Thus, a substantially planar form means a non-curved form with a longitudinal extent.

Furthermore, the connecting section can have connection means for a form-fitting, twist-proof and releasable connection to the base jaw. Corresponding connection means are then also present on the base jaw and are thus formed as the male part or female part. In this respect, the connection means can be brought into engagement with one another by a simple mutual movement in order to allow attachments on base jaws to be easily exchanged.

The connection means can preferably be brought into engagement with the connection means formed on the base jaw by a rotational movement or by a linear sliding movement. Thus, attachments can be exchanged by a simple hand movement.

In a first preferred embodiment of the connection means, the connection means have a cylindrical cavity for receiving a cylindrical pin, formed on the base jaw, or they have a cylindrical pin. In this respect, the alternative formulation is to clarify that the connection means on the attachment and on the base jaw correspond to one another and can be formed either on one side or on the other side. A simple manual rotational movement suffices to attach and release the attachment relative to the base jaw.

The connection means can also have an undercut positioning element and a limiting element. The positioning element and the limiting element engage with the corresponding elements on the base jaw and allow an exact positioning and, if appropriate, also a fixing of the attachment on the base jaw.

In a second preferred embodiment of the connection means, the connection means have a run-in rail for guiding at least one positioning element and/or limiting element formed on the base jaw, or they have at least one positioning element and/or limiting element. Here as well, the alternative formulation is to indicate an alternating formation of the connection means both on the attachment and on the base jaw. This configuration of the connection means allows the attachment to be exchanged by a simple linear sliding movement.

In addition, a fixing arrangement for a releasable fixing of the connection means in the engaged position can be provided. In this respect, the fixing arrangement can achieve the fixing in a purely mechanical manner, for example by a mutual latching action or by means of magnetic elements.

The technical problem indicated above is also solved according to the invention by a base jaw of a pressing tool for pressing fittings to produce pipe connections, whereby here again two base jaws form a pressing jaw of a pressing tool. For this purpose, the base jaw has a base jaw body, an articulated seat for a connection to a further base jaw and an interaction section, for example a run-in contour for the advance of a ram, for interaction with a pressing tool. In this respect, the seat is preferably a hole for receiving a rotation axis of the pressing jaw with a holder with one rotation axis or with two rotation axes.

First of all, the base jaw has a connecting section for a connection to an attachment which has been previously described, and furthermore the connecting section is formed in a complementary manner to the connecting section of the attachment. Thus, different attachments can be easily connected to the base jaw, so that different attachments can be connected to one and the same base jaw.

In this respect, it is particularly advantageous if the connection means are configured identically on each of the two base jaws which are combined into a pair of base jaws to form a pressing jaw, and if each attachment can be fixed to each base jaw by its connection means. Consequently, a simplification is achieved in that a user does not have to choose whether a specific type of attachment has to be fitted to a specific type of base jaw.

The technical problem indicated above is also solved according to the invention by a system for pressing fittings to produce pipe connections, comprising at least two pairs of attachments which have also been described above, and comprising one pair of previously described base jaws, where different pairs of attachments have pressing sections for jaw openings with different nominal widths and where the pairs of attachments have identical connecting sections. The advantages of this type of system have already been explained in the preceding description.

The attachments of different pairs of attachments preferably have an overall size and an outer contour which are adapted to the nominal width of the jaw openings to be formed. In this respect, in particular the possibility of adapting the outer contour has proved to be advantageous. For small nominal widths, thus for the pressing of fittings which have small dimensions, the installation space occupied by the attachment and in particular the installation space occupied by the distal section of the attachment body can be minimised. Thus, fewer problems arise in confined areas for the pressing of fittings of small dimensions.

BRIEF DESCRIPTION OF THE DRAWINGS

In the following, the invention will be described on the basis of embodiments with reference to the drawings, in which.

DESCRIPTION OF THE INVENTION

In the following description of the different embodiments according to the invention, components and elements which have the same function and the same mode of operation have been provided with the same reference numerals, although the components and elements in the different embodiments can differ in dimension and shape.

Figure 1:
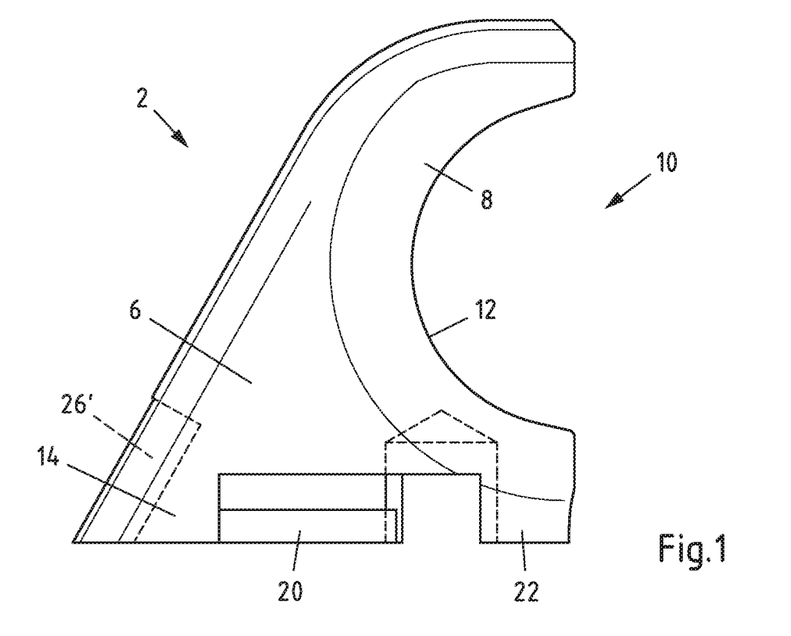
FIG. 1 shows a side view of a first embodiment of an attachment.
Figure 2:
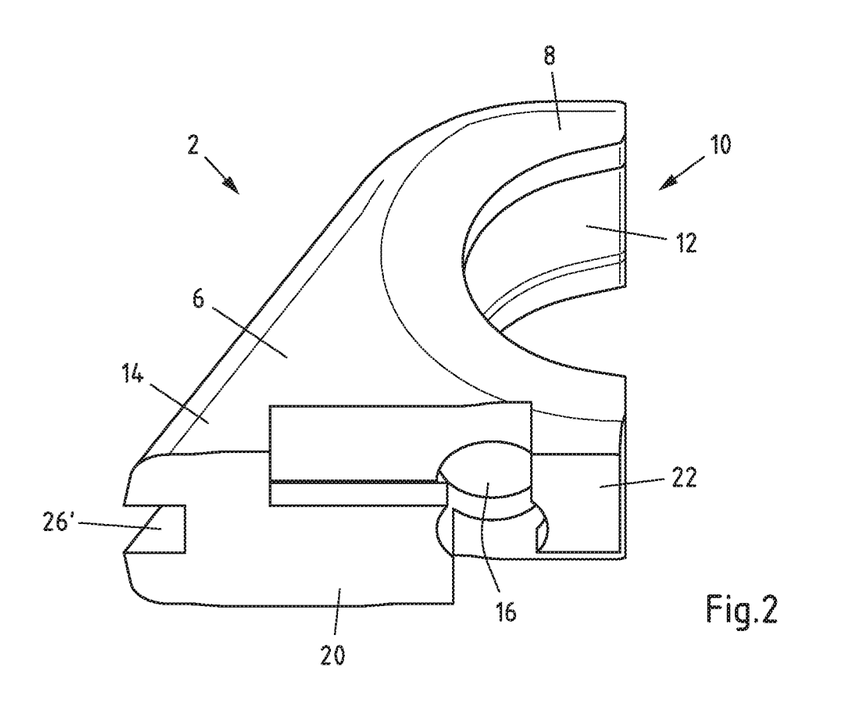
FIG. 2 shows an oblique view from the front of the attachment according to FIG. 1.
Figure 3:
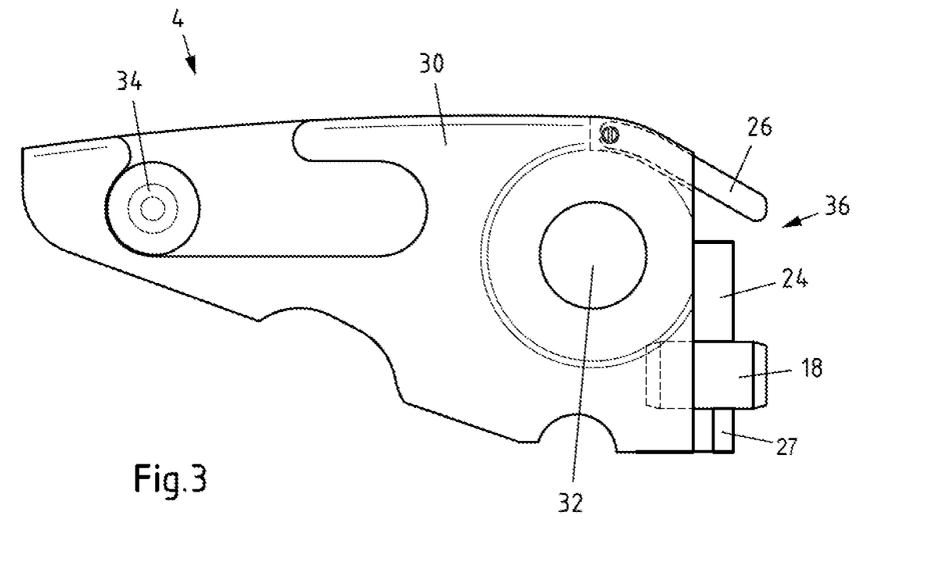
FIG. 3 shows a side view of a first embodiment of a base jaw.
Figure 4:
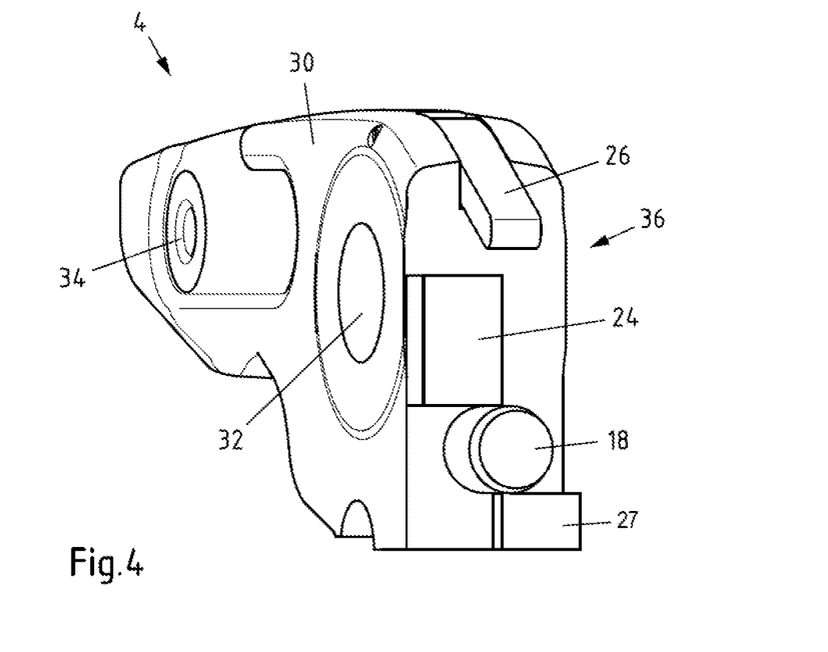
FIG. 4 shows an oblique view from the front of the base jaw according to FIG. 3, FIGS. 5a and 5b show an arrangement of attachment and base jaw during assembly.

FIGS. 1 and 2 show a first embodiment of an attachment 2 according to the invention for a base jaw 4, shown in FIGS. 3 and 4, of a pressing tool for pressing fittings to produce pipe connections. In this respect, in each case two base jaws 4, together with two attachments 2, form a pressing jaw of a pressing tool.

The attachment 2 has an attachment body 6 on which a pressing section 8 is formed to form half of a jaw opening 10. The jaw opening 10 forms the receiving area for the fitting which is to be pressed (not shown) in that the inner pressing surface or pressing contour 12 receives the fitting, rests against said fitting and during pressing, at least partly deforms it. Furthermore, a connecting section 14 is formed on the attachment body 6 for a connection to the base jaw 4.

A combined study of FIGS. 1 to 5 shows that the attachment body 6 forms the entire distal section of the assembled pressing jaw, consisting of attachment 2 and base jaw 4. Therefore, by suitably configuring the structural shape of the attachment body 6, the distal section of the pressing jaw can be configured so that it is easier to handle the pressing jaw, particularly in the case of fittings which have small nominal widths.

Furthermore, the pressing section 8 and the connecting section 14 are arranged at a distance from one another. Thus, the interface between the attachment 2 and the base jaw 4 is separated from the pressing section 8. In addition, the connecting section 14 forms an interface with the base jaw 4, which interface is substantially planar at least in sections.

As can be seen from FIGS. 1 and 2, the pressing section 8 is formed integrally with the attachment body 2. Thus, each attachment has a predetermined pressing section 8 with a pressing surface or pressing contour 12 of a predetermined nominal width.

As will be explained in the following, the connecting section 14 has connection means for a form-fitting, twist-proof and releasable connection to the base jaw 4. These connection means are configured in the form of a female part or male part; thus they correspond to one another.

In the embodiment of the attachment 2 shown in FIGS. 1 and 2, the connection means can be brought into engagement with the connection means formed on the base jaw 4 by a rotational movement. For this purpose, the connection means have a cylindrical cavity 16 for receiving a cylindrical pin 18 formed on the base jaw 4, see FIGS. 3 and 4.

Furthermore, the connection means have an undercut positioning element 20 and a limiting element 22 which cooperate with a corresponding positioning element 24 and with an undercut limiting element 27 on the base jaw. The undercut positioning element 20 of the attachment 2 comprises an abutment surface that contacts a corresponding abutment surface of the undercut positioning element 24 of the base jaw 4 and the limiting element 22 of the attachment 2 comprises an abutment surface that contacts a corresponding abutment surface of the limiting element 27 of the base jaw 4. The abutment surface of the undercut positioning element 20 of the attachment 2 and the abutment surface of the limiting element 22 of the attachment 2 face in opposite directions. The abutment surface of the undercut positioning element 24 of the base jaw 4 and the abutment surface of the limiting element 27 of the base jaw 4 face in opposite directions.

Figure 5A:
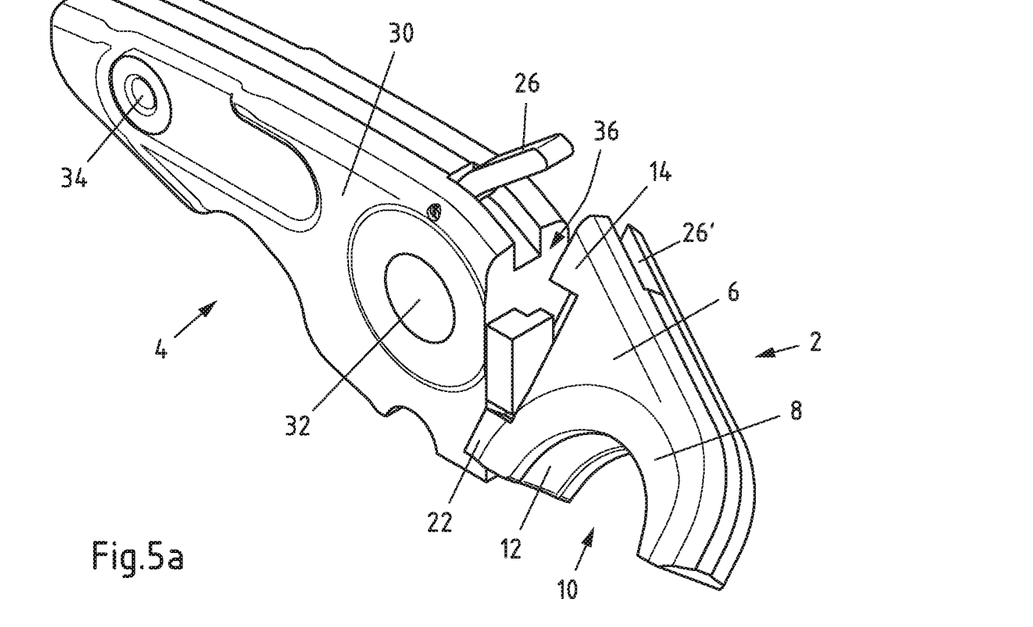
Figure 5B:
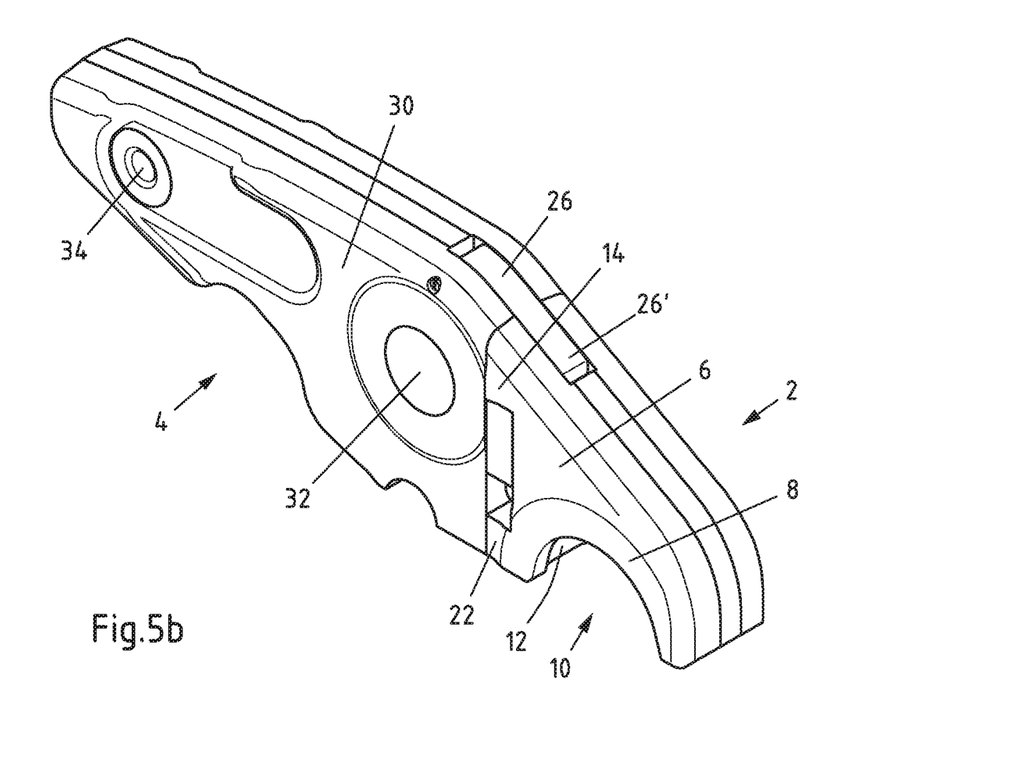
Figure 6:
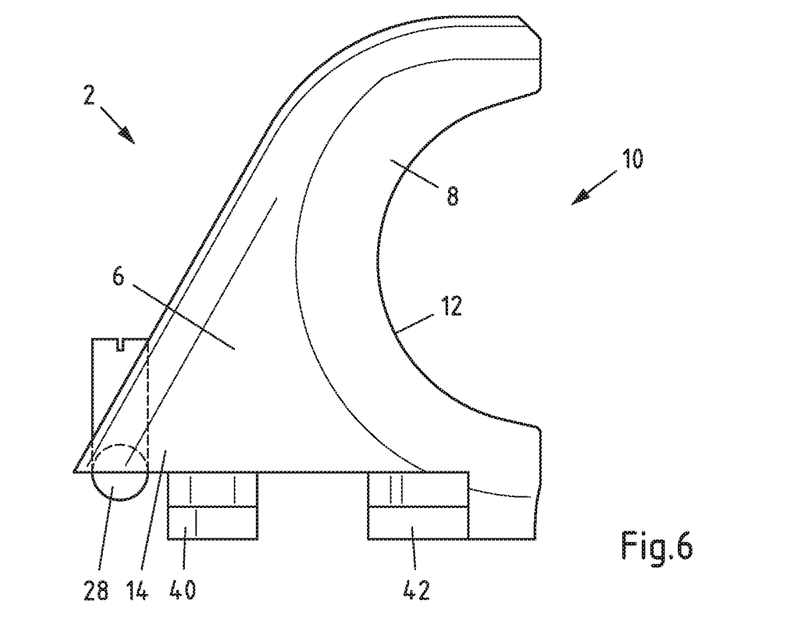
FIG. 6 shows a side view of a second embodiment of an attachment.
Figure 7:
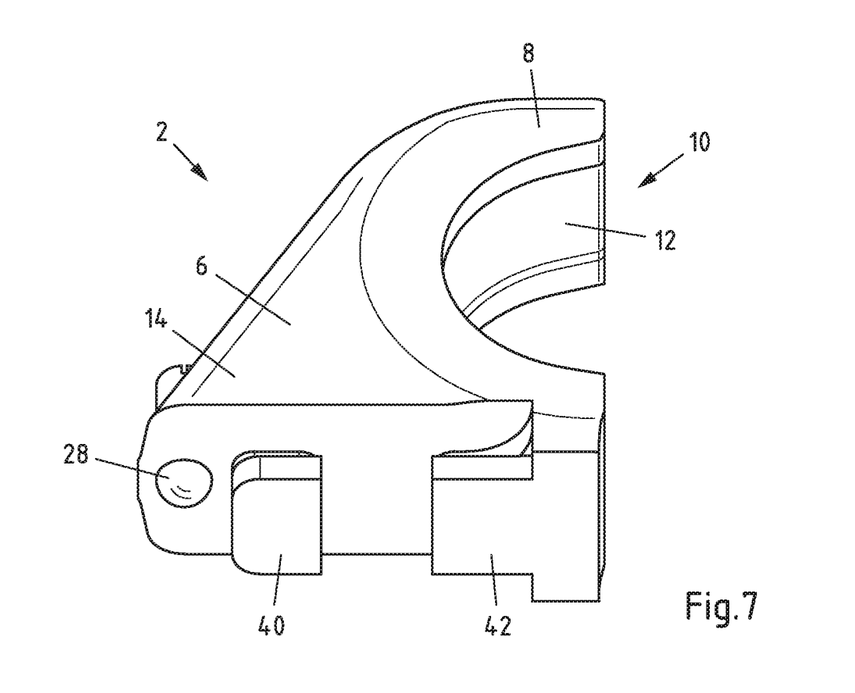
FIG. 7 shows an oblique view from the front of the attachment according to FIG. 6.

FIG. 5 shows that by inserting the cylindrical pin into the cylindrical cavity (both hidden), the attachment 2 is positioned at the base jaw 4 in a rotated position so that subsequently it can be brought into the end position by a rotational movement. As a result, the described connection means engage with one another and provide a twist-proof positioning of the attachment 2 on the base jaw 4.

Finally, another fixing arrangement comprising a swivelable lever 26, fixed to the base jaw 4, and a cavity 26', formed in the attachment body 6 is provided which, when the base jaw and attachment are joined together, fixes the base jaw 4 and the attachment body 6 in a releasable manner in the engaged position.

The base jaw 4, shown in FIGS. 3 and 4, of a pressing tool for pressing fittings to produce pipe connections has, aside from the features described hitherto, a base jaw body 30 with an articulated seat 32 for a connection to a further base jaw 4, the seat 32 being formed as a hole for receiving a rotation axis. For this purpose, the pressing tool has two rotation axes or only one rotation axis, which are fixed by a bilateral holder. A more detailed description is provided below with reference to FIG. 12.

Furthermore, the base jaw body 30 has an interaction section 34, configured here as a hole, so that it can be moved via a coupled lever (not shown). The interaction section 34 is configured to interact with a pressing tool which moves the described lever.

The base jaw body 30 has a connecting section 36 for a connection to an attachment 2 shown in FIGS. 1 and 2, whereby the connecting section 36 being formed in a complementary manner to the connecting section 14 of the attachment 2 and having the previously described elements of cylindrical pin 18, positioning element 24 and limiting element 27.

FIGS. 6 to 11 show a further embodiment of an attachment 2 and of a base jaw 4, where identical reference numerals identify identical elements, as previously described with reference to FIGS. 1 to 5.

In this embodiment, the connection means can be brought into engagement by a linear sliding movement. For this purpose, formed on the attachment 2 on the connecting section 14 is an undercut positioning element 40 and a limiting element 42 which is also undercut, which can be seen in FIGS. 6 and 7.

Figure 8:
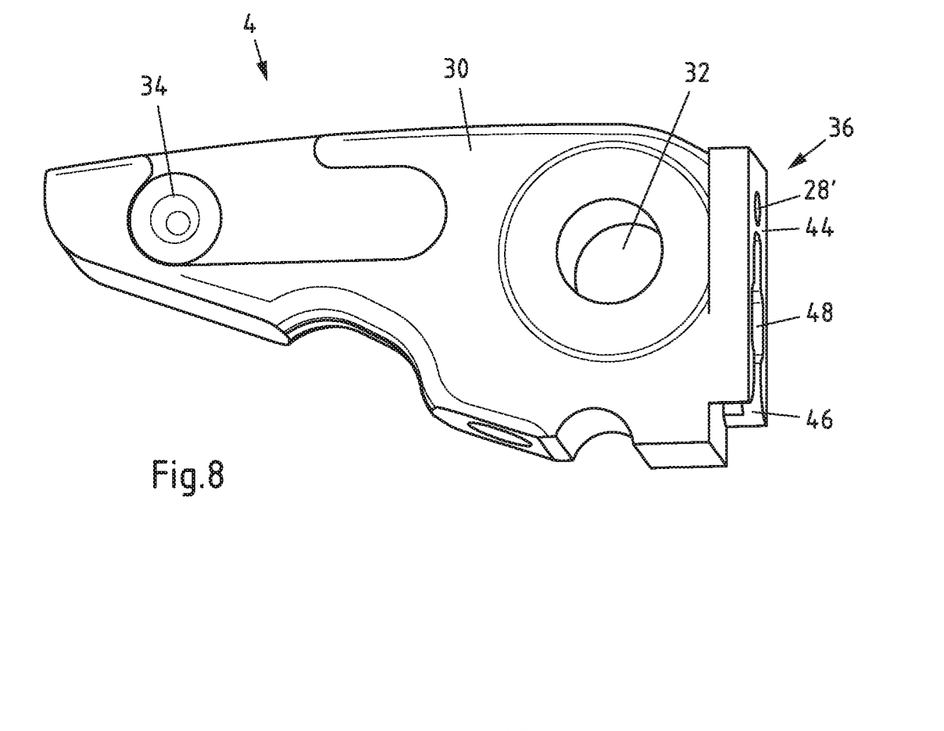
FIG. 8 shows a side view of a second embodiment of a base jaw.
Figure 9:
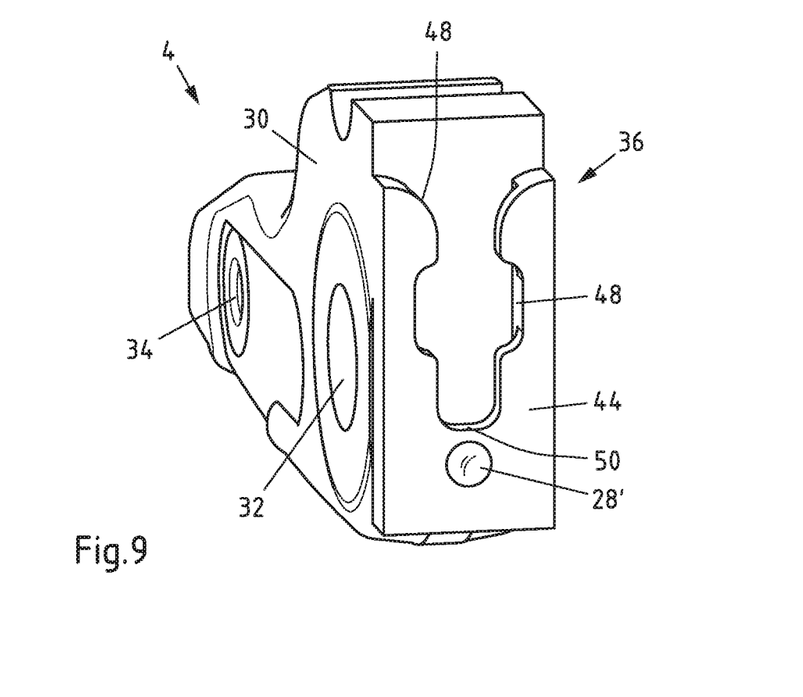
FIG. 9 shows an oblique view from the front of the base jaw according to FIG. 8.

Corresponding to this, formed on the connecting section 36 of the base jaw 4 is a run-in rail 44 having a run-in contour 46, the insertion contour 48 and a limit 50. Thus, the run-in rail 44 of the base jaw 4 forms a guide for the positioning element 40 and for the limiting element 42 formed on the attachment 2.

Finally, in this embodiment as well, a fixing arrangement comprising a spring-loaded ball 28, arranged on the attachment body 6, and a cavity 28', formed at the base jaw 4 is provided to releasably fix the described connection means in their engaged position.

Figure 10:
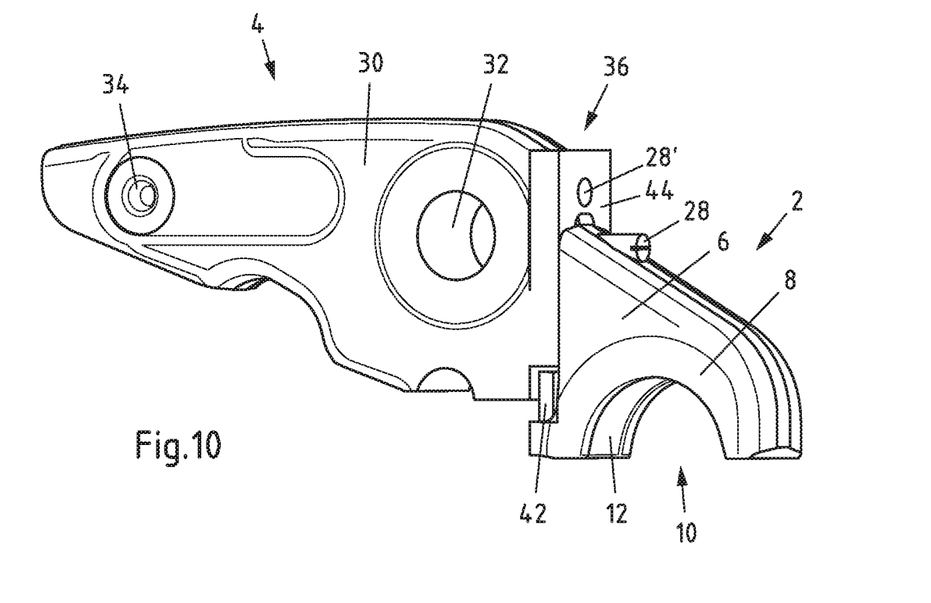
FIG. 10 shows an arrangement of attachment and base jaw according to FIGS. 6 to 8 during assembly.
Figure 11:
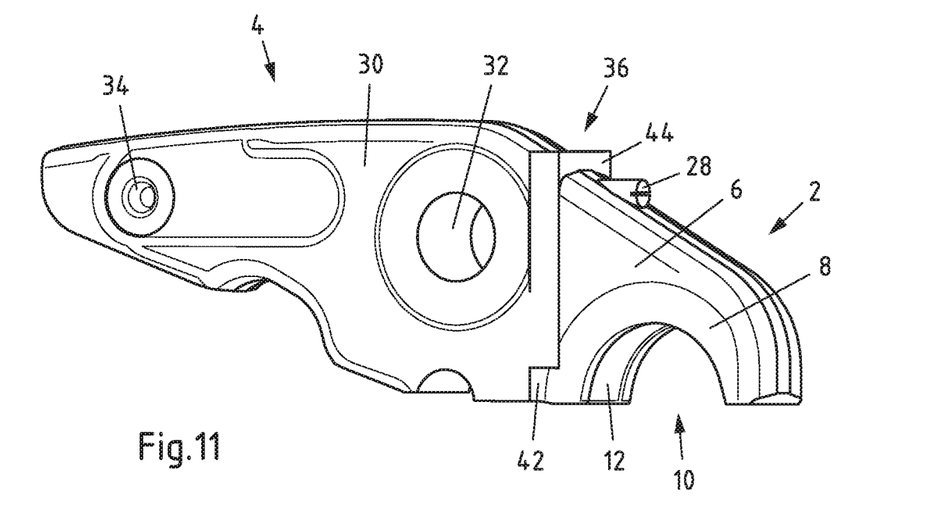
FIG. 11 shows the arrangement according to FIG. 10 in an assembled state.

FIGS. 10 and 11 show the connection of the previously described attachment 2 to the corresponding base jaw 4. FIG. 10 shows the insertion of the attachment 2 with the connecting elements 40 and 42, which can only be partly seen, into the guide rail 44 formed at the base jaw 4. In this respect, the positioning element 40 is guided through the insertion contour 48, while the limiting element 42 is brought into contact with the run-in contour 46. After being inserted, the attachment 2 is moved linearly with respect to the base jaw 4 in order to occupy the position shown in FIG. 11.

Figure 12:
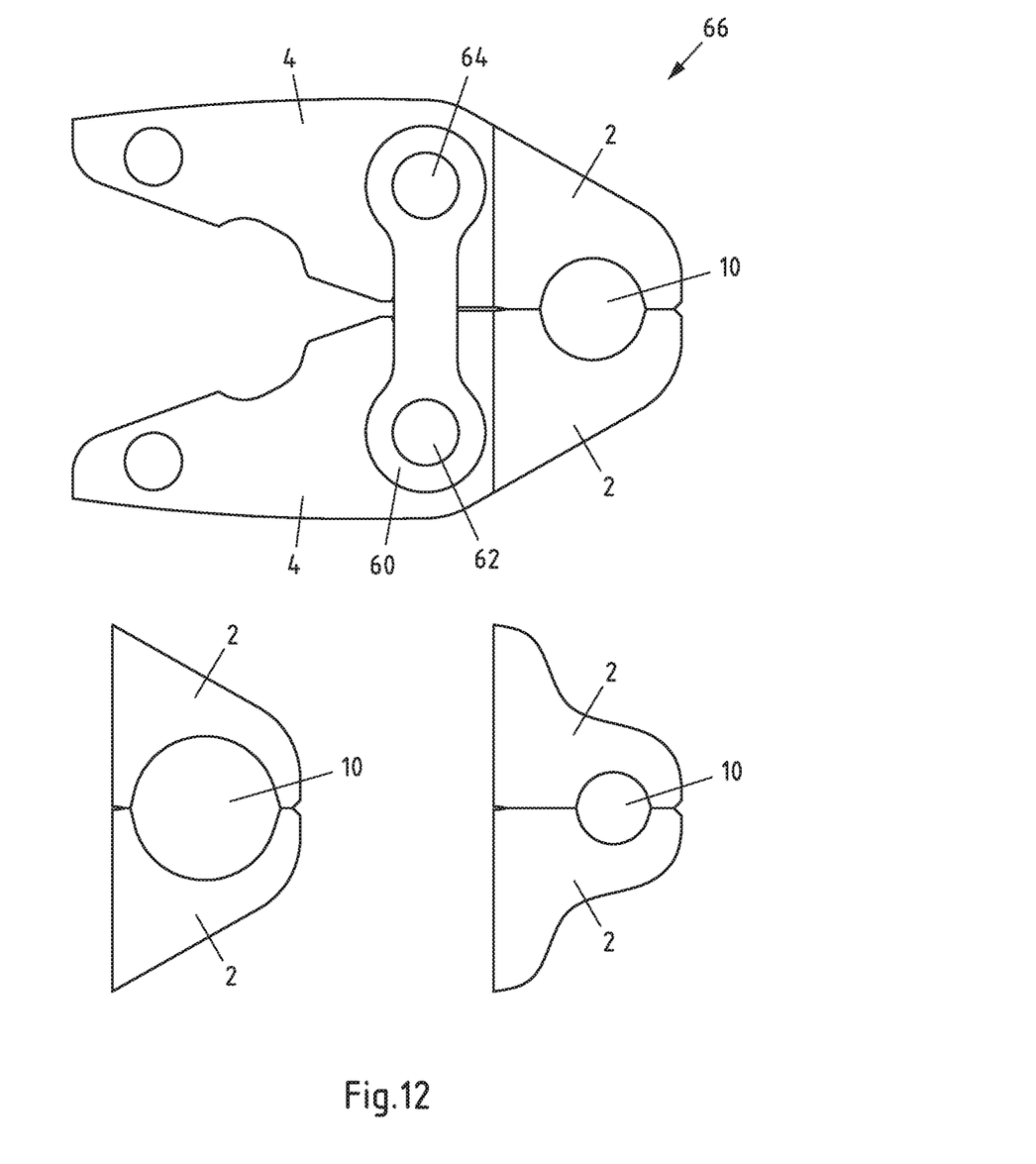
FIG. 12 shows an embodiment of a system for pressing fittings to produce pipe connections.

FIG. 12 shows a system for pressing fittings to produce pipe connections, comprising three pairs of attachments 2 and one pair of base jaws 4. The base jaws 4 are assembled into a pressing jaw 66 by a holder 60 and two axes 62 and 64, and they can be actuated by a manual drive or motor drive of a pressing tool (not shown).

Different pairs of attachments 2 have pressing sections 8 for jaw openings 10 of different nominal widths, and the pairs of attachments 2 have the same connecting sections 14. Thus, the attachments 2 are suitable to be connected to the one pair of base jaws 4.

The attachments 2 of different pairs of attachments then have an overall size and outer contour which are adapted to the nominal width of the jaw openings 10 to be formed and which, in particular for small nominal widths, result in small overall sizes, especially in the region of the distal section of the attachment body 6 and in the region of the pressing section 8.

The invention claimed is:

1. An attachment for a base jaw of a pressing tool for pressing fittings to produce pipe connections, comprising:
   an attachment body;
   a pressing section, formed on the attachment body, to form half a jaw opening; and
   a connection section formed on the attachment body, to connect to the base jaw,
   wherein the attachment body is formed as a distal section of the base jaw,
   the pressing section and the connection section are arranged at a distance from one another, and
   the connection section of the attachment engages a connection section formed on the base jaw by rotational movement of the attachment with respect to the base jaw to thereby provide a form-fitting, twist-proof and releasable connection to the base jaw.

2. The attachment according to claim 1, wherein the pressing section is formed integrally or in an integrated manner with the attachment body.

3. The attachment according to claim 1, wherein a pressing surface of the pressing section corresponds to a nominal value of an external diameter of a fitting.

4. The attachment according to claim 1, wherein the connection section of the attachment forms a substantially planar interface, at least in sections, with the base jaw.

5. The attachment according to claim 1, wherein the connection section of the attachment has a cavity for receiving a pin, formed on the base jaw, or the connection section of the attachment body has a pin.

6. The attachment according to claim 1, wherein the connection section of the attachment has an undercut positioning element comprising an abutment surface that contacts a corresponding abutment surface of the connection section of the base jaw and a limiting element comprising an abutment surface that contacts a corresponding abutment surface of the connection section of the base jaw.

7. The attachment according to claim 1, further comprising a fixing arrangement provided for fixing the attachment to the base jaw in a releasable manner in an engaged position.

8. A base jaw of a pressing tool for pressing fittings to produce pipe connections, comprising:
   a base jaw body;
   an articulated seat for a connection to a further base jaw; and
   an interaction section for interaction with a pressing tool,
   wherein a connection section is formed for a connection to an attachment according to claim 1, and
   the connection section is formed in a complementary manner to the connection section of the attachment.

9. A system for pressing fittings to produce pipe connections, comprising:
   at least two pairs of attachments according to claim 1; and
   one pair of base jaws, wherein the base jaw comprises:
   a base jaw body;
   an articulated seat for a connection to a further base jaw; and
   an interaction section for interaction with a pressing tool,
   wherein a connection section is formed for a connection to said attachment, and
   the connection section is formed in a complementary manner to the connection section of the attachment,
   wherein different pairs of attachments have pressing sections for jaw openings of different nominal widths, and
   wherein the pairs of attachments have identical connecting sections.

10. The system according to claim 9, wherein the attachments of different pairs of attachments have an overall size and outer contour configured to the nominal width of the jaw openings to be formed.

11. The attachment according to claim 5, wherein the pin and the cavity are cylindrical.

12. The attachment according to claim 6, wherein the abutment surface of the undercut positioning element and the abutment surface of the limiting element face in opposite directions.

13. The base jaw of claim 8, wherein the connection section of the base jaw has an undercut positioning element comprising an abutment surface that contacts a corresponding abutment surface of the connection section of the attachment and a limiting element comprising an abutment surface that contacts a corresponding abutment surface of the connection section of the attachment.

14. The system of claim 9, wherein the system further comprises a fixing arrangement for releasably fixing the base jaw to the attachment in an engaged position, the fixing arrangement comprising a swivelable lever attached to the base jaw and a recess in the attachment for receiving the swivelable lever.

15. The system of claim 9, wherein the connection section of the base jaw has an undercut positioning element comprising an abutment surface that contacts a corresponding abutment surface of an undercut positioning element of the connection section of the attachment and a limiting element comprising an abutment surface that contacts a corresponding abutment surface of a limiting element of the connection section of the attachment.

* * * * *

UNITED STATES PATENT AND TRADEMARK OFFICE
CERTIFICATE OF CORRECTION

PATENT NO. : 11,117,247 B2
APPLICATION NO. : 16/197702
DATED : September 14, 2021
INVENTOR(S) : Christian Rischen et al.

It is certified that error appears in the above-identified patent and that said Letters Patent is hereby corrected as shown below:

In the Claims

Column 8, Lines 34-35, Claim 9, after "identical" delete "connecting"

Signed and Sealed this
Twenty-first Day of February, 2023

Katherine Kelly Vidal
*Director of the United States Patent and Trademark Office*